United States Patent [19]

Sambayashi et al.

[11] Patent Number: 4,772,920
[45] Date of Patent: Sep. 20, 1988

[54] IMAGE FORMING APPARATUS

[75] Inventors: Takeshi Sambayashi, Tokyo; Shigenobu Oosawa, Kawasaki, both of Japan

[73] Assignee: Kabushiki Kaisha Toshiba, Kawasaki, Japan

[21] Appl. No.: 945,996

[22] Filed: Dec. 24, 1986

[30] Foreign Application Priority Data

Dec. 24, 1985 [JP] Japan .................. 60-296601
Feb. 28, 1986 [JP] Japan .................. 61-43674

[51] Int. Cl.$^4$ ........................... G03G 15/08
[52] U.S. Cl. ................. 355/14 D; 355/3 DD; 118/657
[58] Field of Search ............. 355/3 R, 3 DD, 14 D; 118/657, 658

[56] References Cited

U.S. PATENT DOCUMENTS 4,591,264  5/1986  Ueda et al. ............... 355/68
4,659,211  4/1987  Oka ....................... 355/14 D Primary Examiner—Patrick R. Salce
Assistant Examiner—Judson H. Jones
Attorney, Agent, or Firm—Cushman, Darby & Cushman

[57] ABSTRACT

An image forming apparatus includes a first developing device for developing a latent image on a photoconductive drum in a first mode and a second developing device for developing a latent image on the photoconductive drum in a second mode. A control means is also provided for selectively producing an output voltage which corresponds to the development device and mode being used.

7 Claims, 16 Drawing Sheets

P→P

N→P

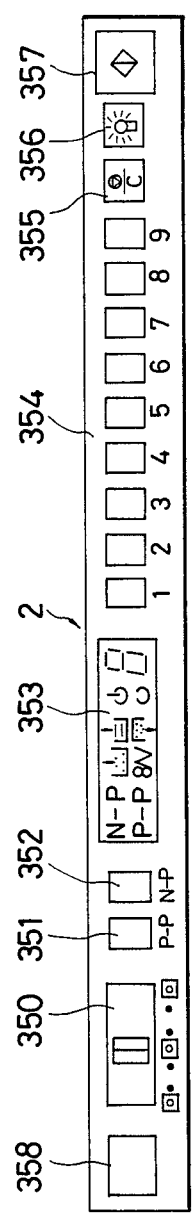

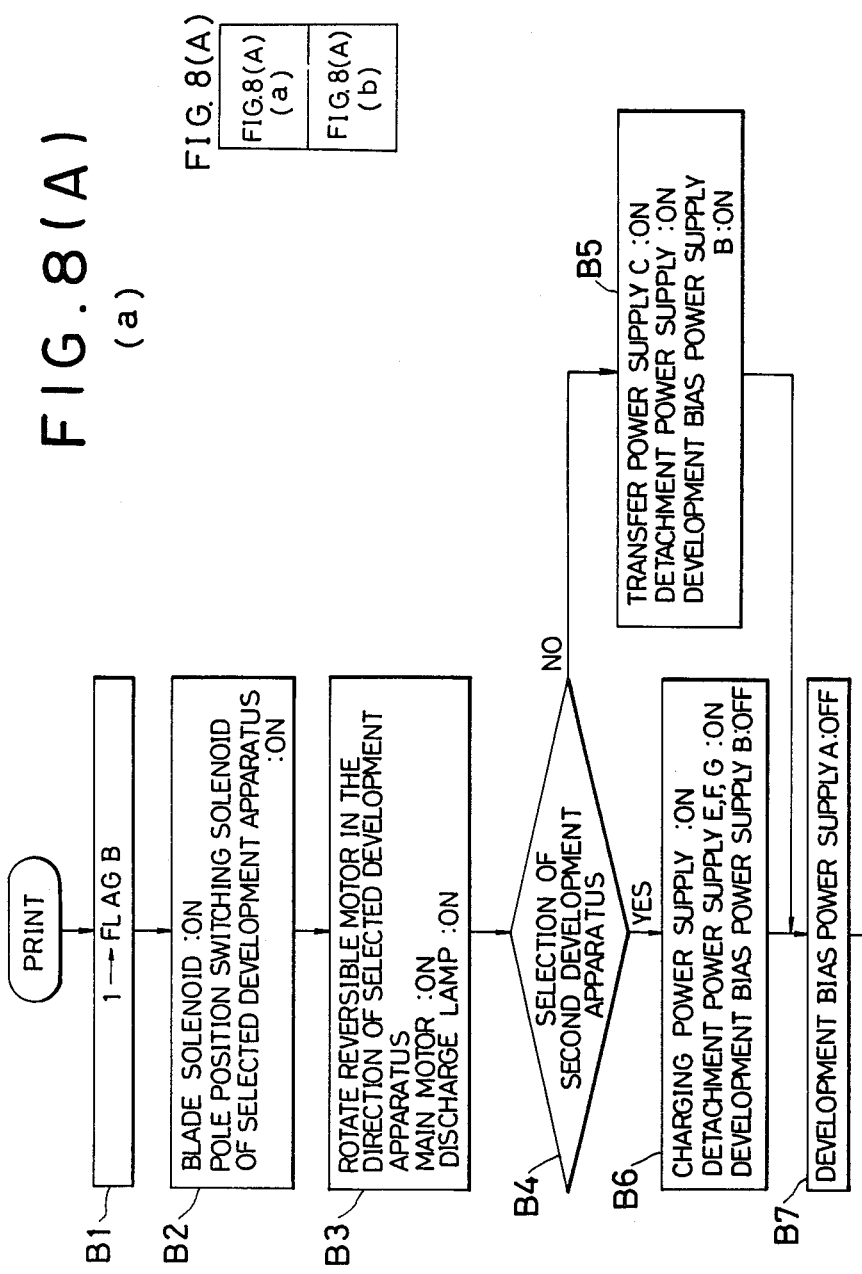

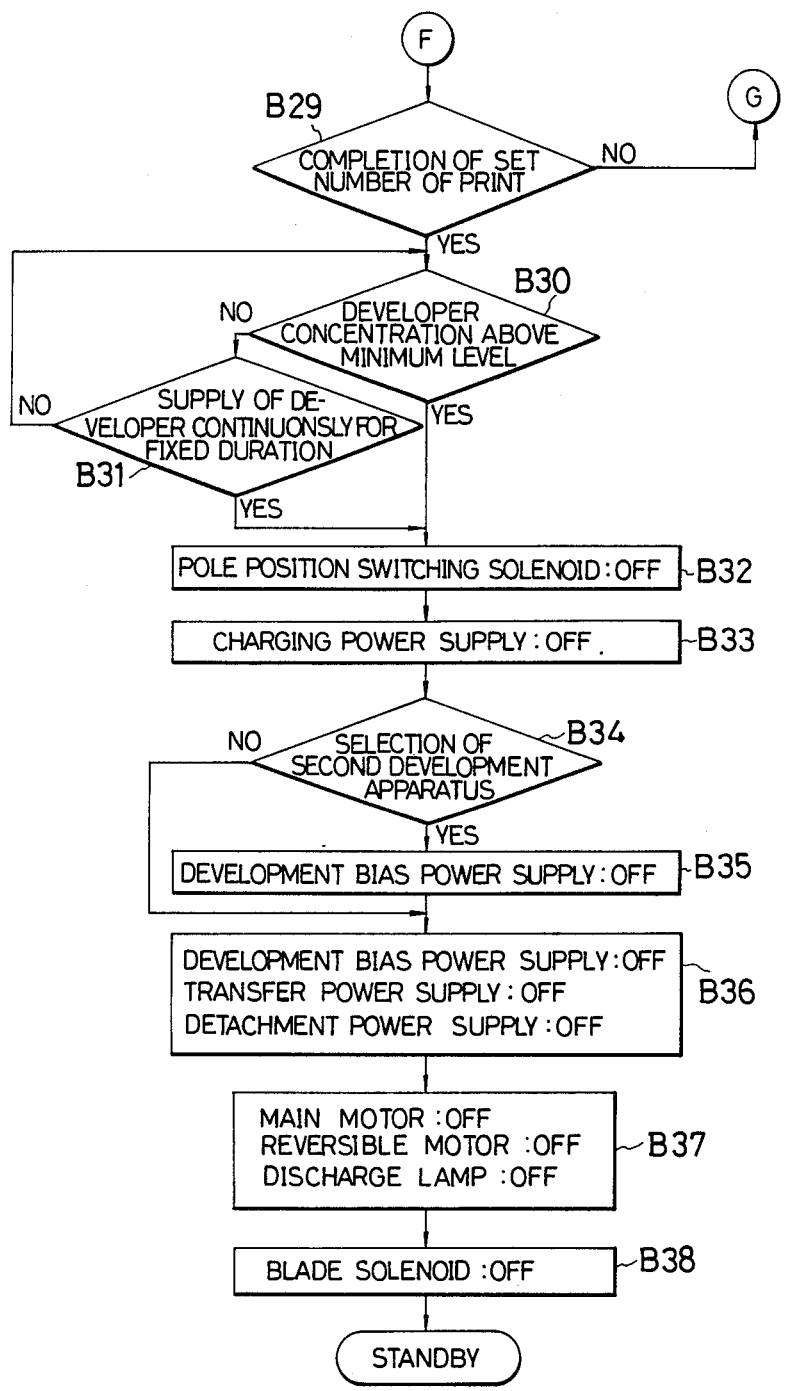

| REMOTE SIGNAL E | REMOTE SIGNAL F | REMOTE SIGNAL G | VOLTAGE APPLIED TO DETACHMENT POWER SUPPLY 159 |
|---|---|---|---|
| ON | OFF | OFF | AC 4.1KV |
| ON | OFF | ON | AC 4.1KV + DC 1.0KV |
| ON | ON | OFF | AC 4.5KV |
| ON | ON | ON | AC 4.5KV + DC 1.0KV |

IMAGE FORMING APPARATUS

BACKGROUND OF THE INVENTION

1. Field of the Invention

The present invention relates to an image forming apparatus which transfers an image recorded in an image recording medium such as microfilm to a recording medium such as paper by means of an electronic photographing method.

2. Description of the Prior Art

Heretofore an image recording medium such as microfilm has been in wide use in recording and storing various kinds of information. There is provided an apparatus which can projects the image on the image recording medium by the use of electronic photographing method and which can record the image on a recording medium such as paper as need arises.

Such a prior example of the apparatus will be described in the following with microfilm reader-printer as an example.

In the microfilm reader-printer, projected light on an image recorded on a microfilm is scanned by a turning mirror. The projected light can be viewed as a projected image or can be utilized to form a latent image on an image carrier (also called a photosensitive drum hereinafter), and the original image is made to reappear on the recording medium by carrying out processings of inverted and direct development, transfer, fixing, and so forth on the latent image.

Now, in a prior apparatus of this kind, when either of the development processings of inverted and direct developments is in progress, the other development means is kept in the on-state while the photosensitive drum is in rotation. The development means consists, for example, of a cylindrical development roller and a magnet which is provided in the inside of the development roller. Such a development means is provided in the neighborhood of the photosensitive drum, and when it is not in use, by keeping it in the state where there is applied a voltage that is to be applied when it is in use, that is, in the on-state, the developer magnetic brush that is formed on the surface of the development roller is removed by displacing the magnet that is housed in its interior.

However, with such a control of the development apparatus which is a development means, it is not possible to remove completely the magnetic brush of the developer off the surface of the development roller. As a result, while one development apparatus is in operation, development by the developer for the other development apparatus which is not in operation will be carried out, so that there was a problem that it becomes a cause of color mixing. Further, in such an image formation apparatus that can carry out inverted an direct developments, each of the two development apparatus develops the portion that was not developed by the other development apparatus. This leads to the so-called "fog phenomenon" which degrades the quality of the image.

Moreover, in a prior microfilm reader-printer, a latent image is formed on an image carrier (photosensitive drum) based on the projected light on an image recorded on the microfilm, develops the latent image on a recording medium in response to a predetermined development mode, and reproduces the original image on a recording medium by carrying out the processings of transfer, fixing, and so on, and the electric charge charged on the recording medium is detached from the image carrier by discharging it by a predetermined voltage that is supplied from a detachment means.

Now, the detachment conditions of the recording medium from the image carrier in such an apparatus, are strongly influenced by the environmental conditions such as the temperature and humidity and the quality of the paper, and so on. Because of this, the width of tolerable variations of the AC voltage that is supplied from the detachment means to the recording medium is often limited to a certain range (for instance, within ±3% of the set value).

Further, in an image forming apparatus that has a plurality of development modes, the development method, characteristics of the developer, and others, are often different for each of the mode, so that the detachment conditions are also affected by the difference in modes.

However, in a detachment method of this kind, it has a construction that the AC output voltage of the detachment power supply is held fixed and cannot be changed in response to the development mode. Because of this, there may occur a state in which detachment is impossible in a specific development mode. Or, even when there exists a detachable charged region, the width of the tolerable variations of the AC output voltage may be narrow. Then, the construction of a detachment means which is equipped with a detachment power supply that can satisfy the detachment conditions for all of the development modes will lead to a problem that would result in a sharp increase in the cost of the apparatus.

Moreover, in the case of an image forming apparatus which can carry out both of the direct development and the inverted development, the polarity of the output of the transfer charger for the recording medium is varied in response to the development mode. With such an arrangement, the recording medium, immediately after passing the transfer charger, is charged positively and negatively for the direct and inverted developments, respectively. In that case, in the corona discharge due to alternating current, negative component generally has a more satisfactory discharge efficiency so that the detachment of the recording medium is satisfactory for the case of the direct development, whereas detachment becomes impossible for the inverted development.

Moreover, not only in such a case but also in an apparatus with a plurality of development modes, development method, characteristics of the developer and others differ for different development modes, as mentioned earlier, and the detachment conditions are also different according to the development mode. For these reasons, development method and developer that approximately satisfy the required conditions have to be selected, which used to be a serious burden in caryring out the product development.

In order to solve the above problem, there was proposed in the past a system which has a detachment power supply that is constructed in such a way as to vary the DC output voltage to be superposed on the AC output voltage, in response to the development mode. In that case, however, there occurs a problem that there exists a large possibility of having a detachment error, because of the variation in the detachable region (width of the tolerable variations) due to the AC output voltage that accompanies the change in the DC output voltage.

SUMMARY OF THE INVENTION

An object of the present invention is to provide an image forming apparatus which can improve the quality of image that is formed in an image forming apparatus that can carry out the inverted development and the direct development.

Another object of the present invention is to provide an image forming apparatus which can prevent the color mixing as well as the "fog phenomenon" in an image forming apparatus that can carry out the inverted development and the direct development.

Another object of the present invention is to provide an image forming apparatus which has a detachment means that can display an excellent detachment function for each of a plurality of development modes.

A feature of the present invention is that, in an image forming apparatus that includes an image carrier means which forms a latent image on its surface by being irradiated with an image of recorded information from the recording medium, a first development means which develops the latent image formed on the surface of the image carrier means by means of a predetermined first method, and a second development means which develops the latent image formed on the surface of the image carrier means by means of a predetermined second method, the present apparatus further includes a microprocessor (400) which has a CPU, a ROM, and a RAM, that performs various kinds of operations and calculations and generates control signals including remote signals, in accordance with a control program and detected signals from switches and sensors, and a power supply means for development bias (407) which selectively generates first and second output voltages for a first magnetic roller of the first development means and a second magnetic roller of the second development means, respectively, in response to the remote signals from the microprocessor, when any one of the first and second development means is in use. Further, the development bias power supply means includes a boosting transformer (502), a main control portion (501) and a relay that are connected to the primary winding of the transformer, a diode (503) and a first resistor (506) that are connected in series between one end of the secondary winding of the transformer and the first magnetic roller of the first development means, a capacitor (504) and a second resistor (505) that are connected in parallel between the cathode of the diode and the other terminal of the secondary winding of the transformer, and relay contacts ($N_o$, $N_c$) provided at each of one terminal of the first and second resistors, where one terminal of the movable arm switch (COM) of the relay is connected to the second magnetic roller.

Another feature of the present invention is that, in an image forming apparatus which has an image carrier means that forms a latent image on its surface by being irradiated with an image of recorded information from a recording medium and a development means which develops the latent image that is formed on the image carrier means by means of a plurality of methods, the present image forming apparatus further includes a microprocessor (400) which has a CPU, a ROM, and a RAM, and carries out various kinds of operations and calculations to generate control signals including remote signals in accordance with a control program and detected signals from switches and sensors, a detachment charger which detaches the electrically charged recording medium from the image carrier by the use of discharge phenomenon, and a detachment power supply which has an AC power supply unit that can vary the AC component and a DC power supply unit that can superpose a prescribed DC output component on the AC output component of the AC power supply unit, and supplies a changed AC output component to the detachment charger in accordance with the remote signals from the microprocessor, corresponding to the plurality of development methods.

These and other objects, features, and advantages of the present invention will be more apparent from the following description of the preferred embodiments, taken in conjunction with the accompanying drawings.

BRIEF DESCRIPTION OF THE DRAWINGS

FIG. 5 is a schematic explanatory view of the operational panel in the first embodiment of the apparatus;

FIG. 6, consisting of combined

FIGS. 8(a), 8(b), and 8(c) represents a flow chart of the print operation at the time of connecting to the power supply;

DESCRIPTION OF THE PREFERRED EMBODIMENTS

Figure 1:
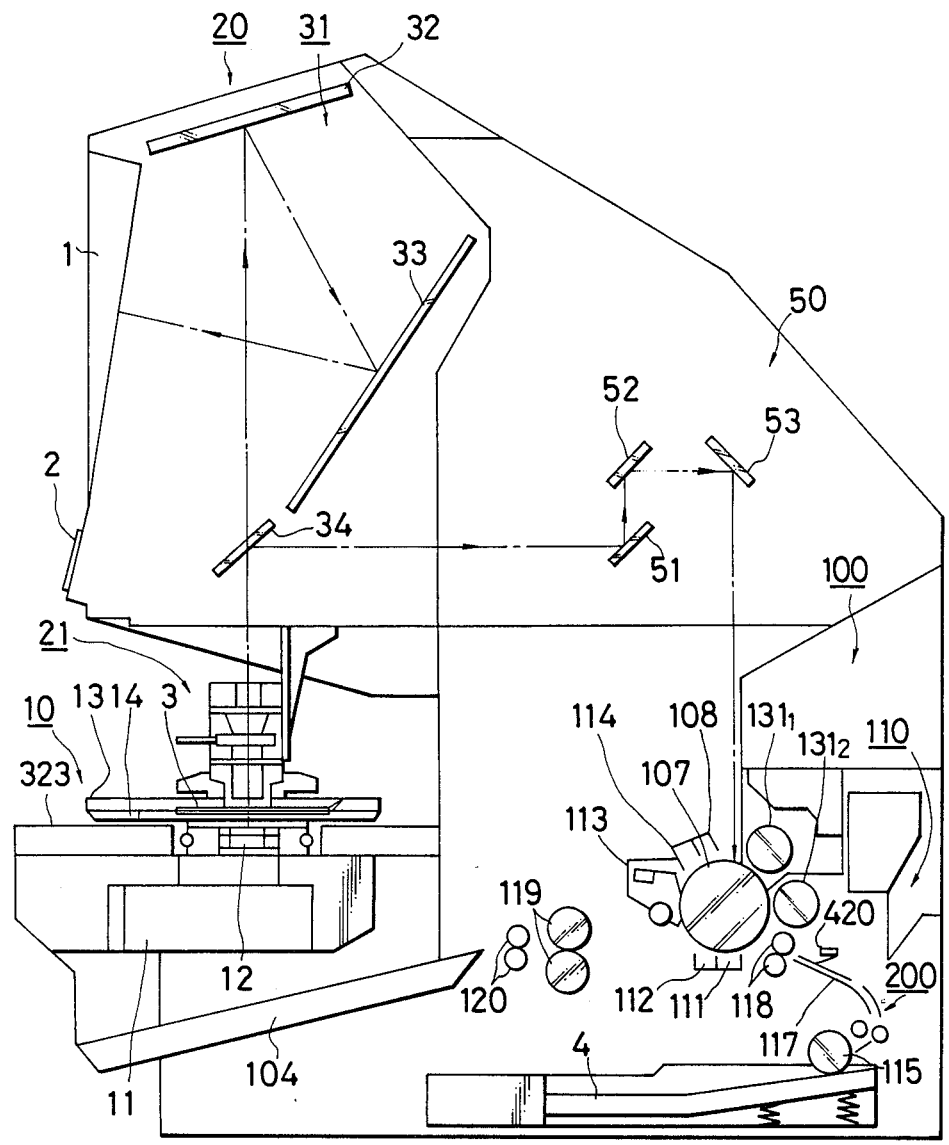
FIG. 1 is a schematic cross sectional view of a microfilm reader-printer embodying the present invention.

Referring to FIG. 1, there is shown a microfilm reader-printer embodying the present invention.

The microfilm reader-printer has a projection screen 1 which projects a microfilm by enlarging, an operational panel which has various kinds of operating keys, film pressing plates 3 for holding the microfilm in between, arranged on its front surface side. In addition, a paper feeding cassette 4 for film copying can be attached and detached from the front surface side, and the paper on which is formed a film image is arranged to be ejected from above the attaching and detaching opening of the paper feeding cassette 4. In this way, the apparatus is constructed so as to be able to carry out required operations for projection and copying of microfilm from the front side of the apparatus body.

The internal structure of the microfilm reader-printer comprises a film setting unit 10 which has the film pressing plates 3 on the top surface and has a light source 11 built below the film pressing plates 3, a projection unit 20 which projects the film image on the projection screen, a scanning light guiding unit 50 which guides the scanning light formed by a turning mirror 34 in the projection unit 20, an image forming unit 100 which forms an image on the recording medium in the paper feeding cassette 4, based on the scanning light from the scanning light guiding unit 50, and a transportation system 200 which transports a recording medium (paper) from the paper feeding cassette 4 on a predetermined route. Here, the film setting unit 10 and the projection unit 20 form a projection means, and the turning mirror 34 and the scanning light guiding unit 50 form a scanning means.

Next, the construction and the operation of the projection unit will be described in detail by referring to FIG. 1.

The projection unit 20 consists of a lens holder portion 21 and a screen projection portion 31.

The lens holder portion 21 carries out focus adjustment of the projected image and rotational adjustment of the projected image on the projection screen 1.

the screen projection portion 31 displays the projected image on the projection screen 1 based on the projection light incident via the lens holder portion 21. As the component members for projecting an image on the projection screen 1 in the screen projection portion 31, are a first and a second mirrors 32 and 33, in addition to the projection screen 1. The projected light incident via the lens holder portion 21 is reflected successively by the first and the second mirrors 32 and 33 to be projected on the projection screen 1. On the incidence end side of the screen projection portion 31, there is arranged a turning mirror 34 which is movable back and forth in the direction from the front surfaces toward the rear surface of FIG. 1, and is also able to change the angle of inclination of the mirror. When an image is to be projected on the projection sereen 1, the turning mirror 34 is held fixed at a position which is away from the position that is directly above the lens holder portion 21, so as not to obstruct the incidence of light on the first mirror 32.

Further, when copying is to be carried out in the image forming unit 100, the turning mirror 34 is arranged over the lens holder portion 21, and the projected light is successively scanned by changing the inclination of the mirror to be led to the scanning light guiding unit 50 which appears in the succeeding stage. Here, the turning mirror 34 is driven by a motor which is not shown.

The scanning light guiding unit 50 is for guiding the scanning light reflected by the turning mirror 34 to form an image on the photosensitive drum 107 in the image forming unit 100. The scanning light guiding unit 50 consists of a third, fourth, and fifth mirrors 51, 52, and 53, respectively. With such a configuration the projected light is led to the surface of the photosensitive drum 107 that will be described later.

Figure 2:
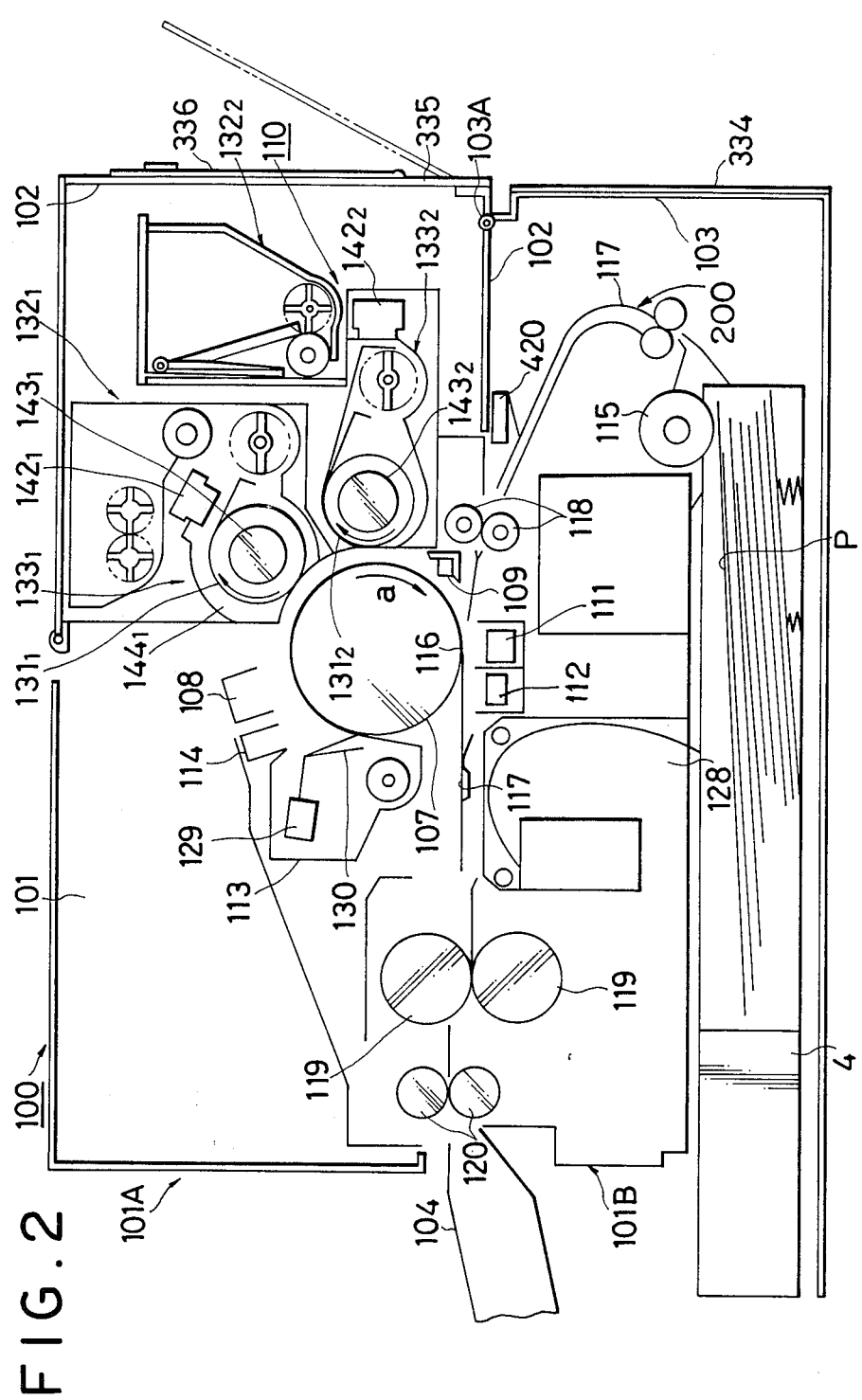
FIG. 2 is a schematic cross sectional view of the image forming unit for the apparatus shown in FIG. 1.

Next, the configuration and the operation of the image forming unit 100 will be described. FIG. 2 is a schematic cross sectional view of the image forming unit 100. In the figure, 101 is the body of the image forming unit, and on the bottom side of the body 101 and on the left side surface (front side of the microfilm reader-printer) of the body 101 there are set the paper feeding cassette 4 and a tray for ejected power 104, respectively. In addition, at about the center of the body 101, there is arranged the photosensitive drum 107 which is the image carrier. Over the photosensitive drum 107 there are arranged a shutter mechanism which is not shown for shielding the scanning light from the scanning light guiding unit 50, and a driving solenoid for the mechanism.

Further, in the surroundings of the photosensitive drum 107, there are arranged successively a charger 108, a development device 110, pre-transfer discharger 109, transfer charger 111, detachment charger 112, cleaner 113, discharge lamp 114, and others. In addition, in the lower portion of the body 101, there is provided a transportation system 200 which includes a paper transporting route 117 that leads a paper P which is taken out automatically from the paper feeding cassette 4 via a paper feeding roller 115, through an image forming portion (image transfer portion) 116 formed between the photosensitive drum 107 and the transfer charger 111, to the tray for ejected paper 104. On the upstream side of the image transfer portion 116 of the paper transporting route 117 there are arranged a detector 420 for detecting the paper P and resist rollers 118, and on the downstream side there are arranged heat rollers 119, as a fixing means, and on the further downstream there is provided the paper eject rollers 120.

When the photosensitive drum 107 is driven in the direction of the arrow a, the drum is first charged uniformly by the charger 108, and the scanning light from the scanning light guiding unit 50 is imaged successively on the photosensitive drum 107 to form an electrostatic latent image. The electrostatic latent image thus formed is developed by the development apparatus 110 to be brought out explicitly, and is sent to the side of the transfer charger 111.

On the other hand, the paper P supplied from the paper feeding cassette 4, after the passing condition of its leading edge and the trailing edge are detected by the detector 420, is supplied by the resist rollers 118 to the image transfer portion 116 where the image which was formed beforehand on the photosensitive drum 107 is transferred to the transfer charger 111.

The paper P on which is transferred the image in this manner, is detached from the photosensitive drum 107 by the detachment charger 112, led to heat rollers 119 by travelling on the paper transporting route 117. After the transferred image is fixed by melting at the heat rollers 119, the paper P is ejected to the tray for ejected paper 104 by paper eject rollers 120.

On the other hand, after transfer of the image on the paper P, the residual image on the photosensitive drum 107 is erased, to be ready for the next copying operation.

Now, in the body 101, an upper frame 102 that has a first side panel 336 and a lower frame 103 that has a second side panel 334 are hinged at one edge suction via a supporting axis 103A. In the upper frame 102, each of the devices of the charger 108, development device 110, cleaner 113, discharge lamp 114, and others are attached with appropriate means on the circumference of the photosensitive drum 107, to form an upper unit 101A.

Further, in the lower frame 103, each of the mechanisms of the paper feeding cassette 4, paper feeding roller 115, transfer charger 11, detachment charger 112, heat rollers 119, paper eject rollers 120, tray for ejected paper 104, and the main motor and others are attached with appropriate means, to form a lower unit 101B.

Moreover, 129 shown in FIG. 2 is a blade solenoid for accessing to and receding from, a cleaning blade 130 of the cleaner 113, the photosensitive drum 107.

Next, the development device 110 which forms the development means will be described in more detail. The development device 110 has a first development roller $131_1$ and a second development roller $131_2$, as shown in FIG. 1. It is arranged that, by a selective driving of the development rollers $131_1$ and $131_2$, it is possible to develop both of a positively recorded microfilm and a negatively recorded microfilm into positive images. That is, the development device 110 is subdivided into two parts of a first development apparatus $132_1$ that includes the first development roller $131_1$ and a second development apparatus $132_2$ that includes the second development roller $131_2$, and it is arranged that the first development apparatus $132_1$ and the second development apparatus $132_2$ are to carry out the direct development (positive→positive development) and the inverted development (negative→positive development), respectively.

Next, referring to FIG. 3, the positive→positive (referred to as P→P hereinafter) development and the negative→positive (referred to as N→P hereinafter) development, in the development device 110 with the above configuration, will be described.

Figure 3:
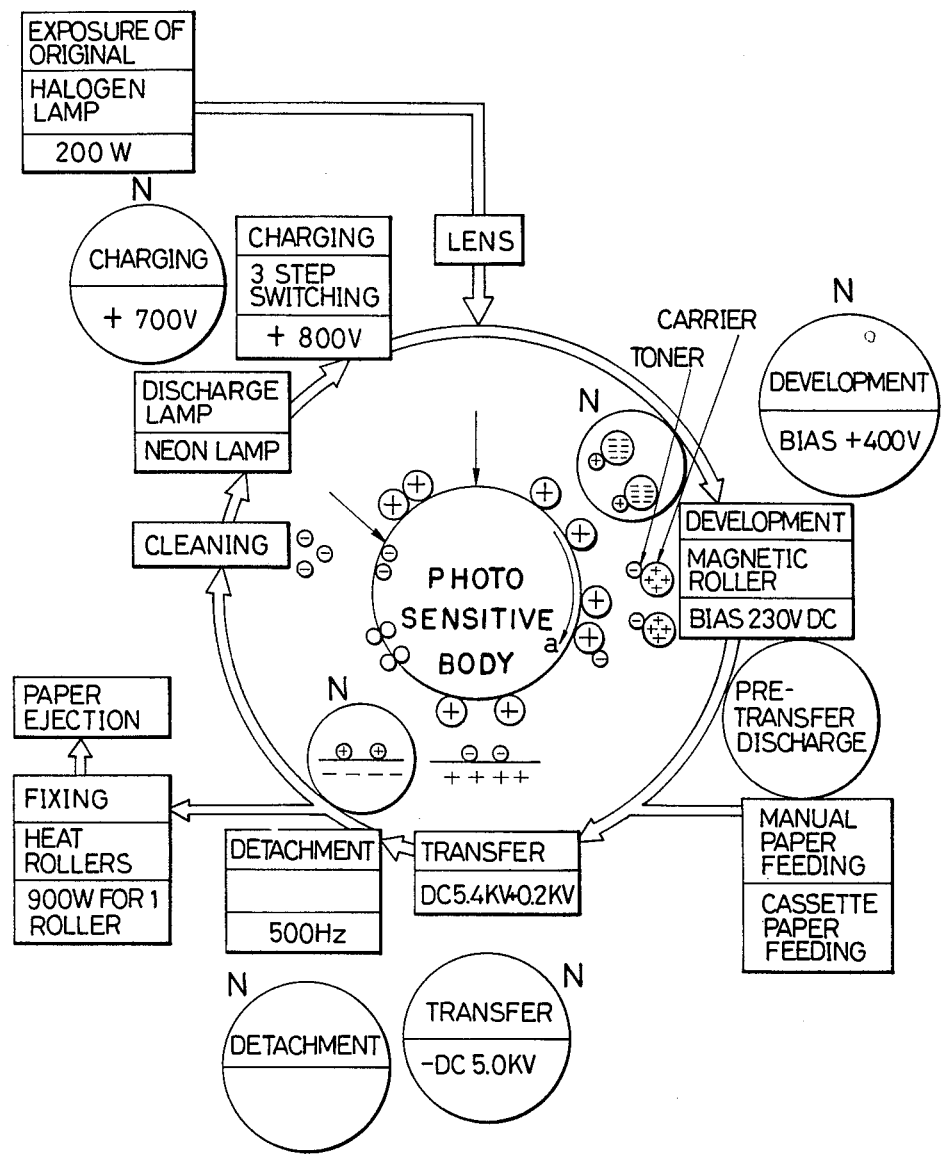
FIG. 3 is an explanatory diagram for illustrating both development operations of the positive→positive development and the negative→positive development in the apparatus shown in FIG. 1.

In FIG. 3 there are explained the operations of the P→P development and the N→P development. In the figure, the operations in rectangles refer to the P→P development, and the operations for N→P development which differ from the P→P development alone will be shown in circles.

First, the P→P development will be described. In carrying out the P→P development, a P→P selection key, to be described later that is on the operating panel 2, is pressed down, to set the first development alone to the operating condition according to the action of the development device 110 described in the foregoing. In the P→P development, the charger 108 charges the photosensitive drum 107 positively at a surface potential of 800 V. Then, by the scanning of the turning mirror 34, scanning light on the microfilm irradiates the photosensitive drum 107 via the scanning light guiding unit 50.

Figure 4A:
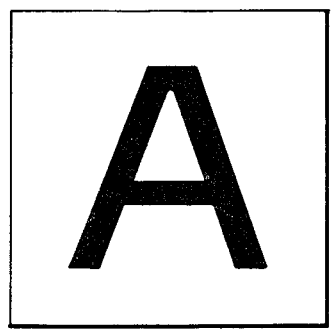
FIGS. 4(a) and 4(b) are schematic explanatory diagrams which show positive and negative microfilm images, respectively.

Now projected light (scanning light) for a positively recorded microfilm as shown in FIG. 4(a) will irradiate the photosensitive drum 107 corresponding to the areas other than that of the letter A. Accordingly, the surface potential on the photosensitive drum 107 in the area corresponding to those other than that of the letter A is attenuated, and the surface potential on the photosensitive drum 107, only in the area that corresponds to the letter A, survives. As a result, there is formed an electrostatic latent image that corresponds to the letter A on the microfilm.

On the other hand, the magnetic roller 143, contained in the first development apparatus $132_1$ is given a bias voltage of 230 V. At the same time, the toner and the carrier in the developer mechanism portion $133_1$ are frictionally charged to negatively and positively, respectively, in accordance with the charging series for both materials. The toner which is transported together with the carrier along the peripheral surface of a sleeve $144_1$, is adsorbed on the photosensitive drum 107 by Coulomb force, by being faced with the latent image on the photosensitive drum 107, bringing out explicitly the electrostatic latent image.

On the other hand, a paper P which is supplied by the paper feeding cassette 4 is synchronized by the resist rollers 118 that are controlled by a control circuit, and is led to the transfer charger 111. The developed image arrives at the transfer charger 111 in accordance with the rotation of the photosensitive drum 107, and at the image transfer portion 116 the image is transferred to the paper P by the transfer charger 111.

Here, the voltage applied to the transfer charger 111 in this case is set to DC 5.4 kV.

After that, the paper P is detached from the photosensitive drum 107 by the detachment charger 112. In so doing, the detachment charger 112 is driven at a voltage of AC 4.1 kV. Following that, the paper P is led to the heat roller 119 by passing the paper transporting route 117, and after the transferred image is fixed by melting, it is ejected by the paper eject rollers 120 to the tray for ejected paper 104. In this manner, the P→P development is completed.

Next, the N→P development will be described. In carrying out the N→P development, the N→P selection key, to be described laer which is located on the operating panel 2, is pressed down, and the second development apparatus alone is set to operating condition in accordance with the operation of the development device described earlier. In the N→P development, the charger 108 charges the photosensitive drum 107 positively to a surface potential of 800 V. After that, the scanning light of the microfilm 5 irradiates the photosensitive drum 107 via the scanning light guiding unit 50, by the scanning of the turning mirror 34.

Figure 4B:
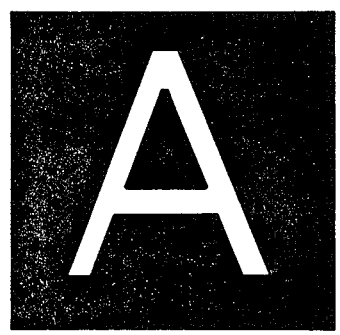

Here, the projected light (scanning light) for a negative microfilm as shown in FIG. 4(b) irradiates the photosensitive drum 107 corresponding only to the portion of the letter A. Accordingly, the surface potential on the photosensitive drum 107 in the area that corresponds to the portion of the letter A is attenuated, and the surface potential on the photosensitive drum 107 that corresponds to the area other than that of the letter A survives.

The magnetic roller $143_2$ which is contained in the second development apparatus $132_2$ is given a bias voltage 400 V, and the toner and the carrier in the developer mechanism $133_2$ are frictionally charged positively and negatively, respectively, in accordance with the charging series for the two materials. Consequently, the region corresponding to the portion of the letter A on the photosensitive drum 107 (region where the surface potential is attenuated) becomes to have an apparently negative potential with respect to the magnetic roller $143_2$, and the toner which is charged positively with respect to that region is adsorbed by Coulomb force.

As a result, on the surface of the photosensitive drum 107 there is carried out development corresponding to the letter A. After that, the photosensitive drum 107 arrives at the pre-transfer discharge lamp 109 accompanying the rotation of the photosensitive drum 107. Here, a discharge before transfer is carried out. This is because the paper P is usually tends to be charged negatively, and in the N→P development, the surface potential of the photosensitive drum 107 in the area other than the developed region remains at a high value, and satisfactory detachment of the paper P from the photosensitive drum 107 may sometimes fail to be accomplished unless a pre-transfer discharge is carried out.

That is to say, the pre-transfer discharge is given to enhance the detachment effect.

Next, the image on the photosensitive drum 107 is transferred to the paper P at the position of the image transfer portion 116 by the transfer charger 111 that is controlled as described earlier. In this case, in order to transfer the positively charged toner, there is applied a voltage of DC −5.0 kV to the transfer charger 111. The paper P is then detached from the photosensitive drum 107 by the detachment charger 112.

Thereafter, the paper P is ejected to the tray for ejected paper 104 analogous to the case of the P→P development. It should be noted that the kind of the toner to be used for the P→P development differs from that for the N→P development so that the heating temperature and the pressurizing force for the heat rollers 119 may be arranged to be varied for each kind of development in order to realize the optimal fixing of each of the toners.

In the apparatus of the present embodiment, there are installed both of the first development apparatus $132_1$ for the P→P development and the second development apparatus $132_2$ for the N→P development. If the apparatus is switched to the other mode while it is developing in one mode, there will be created inconvenience due to the switching of the various devices. For this reason, it is constructed in such a way as to forbid the selection of the P→P and the N→P selection keys that are provided on the operating panel while development is in progress, as will be described later.

Further, in the apparatus of the present embodiment, it is arranged, for the first copying after switching between the P→P and N→P developments, to let the photosensitive drum 107 race for one turn, for example, in order to avoid the occurrence of a situation in which the P→P development or the N→P development is given continuously within a short time. This is done so due to the circumstance that after one type of development is over, there remains the history of positive or negative charging on the photosensitive drum 107 so that it becomes necessary to eliminate the history by shifting the timing of the copying.

Next, referring to FIG. 5, the operating panel 2 will be described.

In FIG. 5, 350 is an exposure regulating volume, 351 and 352 are the P-P and N-P development selection keys, respectively, and 353 is a display board.

In addition, 354 is a copy number set key, 355 is a clear-stop key, 356 is a standby key, 357 is a copy start key, and 358 is a main key.

Here, on the display board 353 are displayed, based on signals from various kinds of sensors or the like, N-P display, P-P display, toner supply display, paper supply display, paper jamming display, copy waiting display, copy enable display, copy number display, and so forth. The main switch 358 is the switch for starting the driving of the microfilm reader-printer. By turning the main switch 358 on, the light source 11 in the film setting unit 10 is turned on to enable the projection, as well as the heater in the image forming unit 100 is turned on.

Figure 6A:
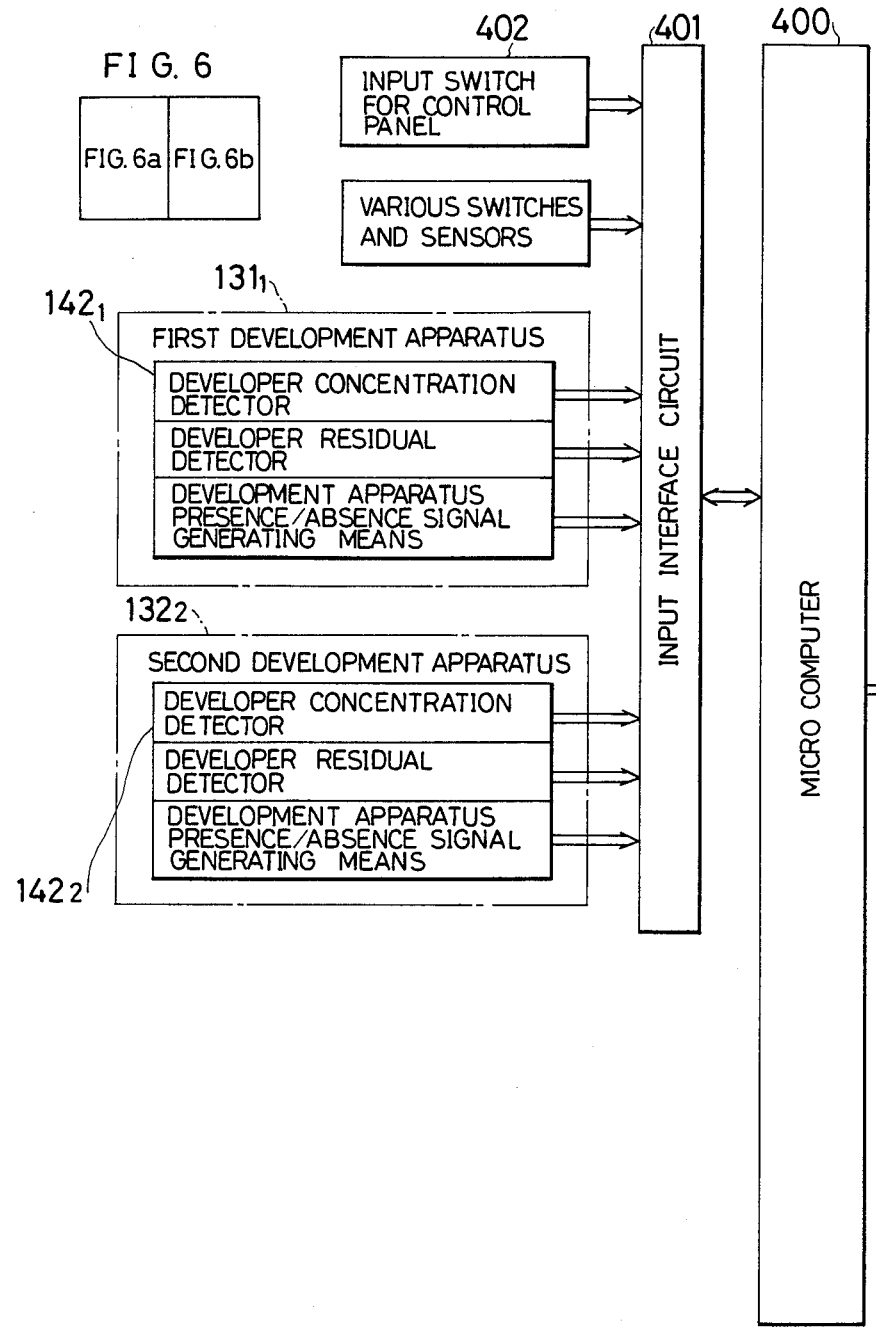
FIGS. 6A and 6B, is a block diagram which shows the control circuit of the first embodiment of the apparatus.
Figure 6B:
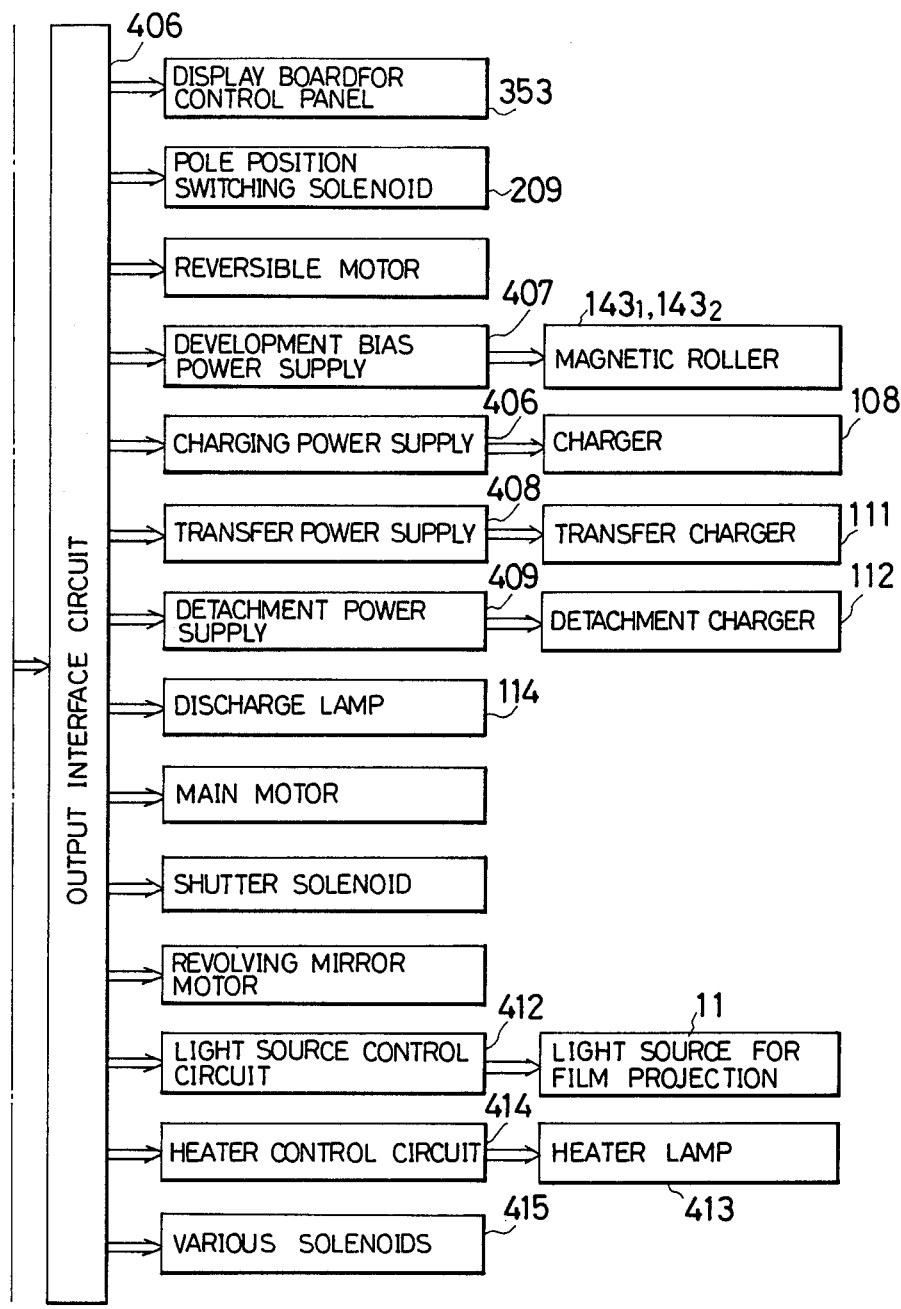

Next, referring to FIG. 6, the control circuit will be described. In the figure, 400 is a microcomputer as the main contorl portion which controls the operation of the apparatus as a whole.

Connected to the microcomputer 400 via an input interface circuit 401 such as a data select, are input switches 402 which consist of various kinds of keys 351, 352, 354 to 357, and so on that are on the control panel, various kinds of switches and sensors such as the detector 420 that are necessary for control, a developer concentration detector $142_1$, developer residual detector, and developer presence/absence signal generating means of the first development apparatus $132_1$, a developer concentration detector $142_2$, developer residual detector, developer presence/absence signal generating means of the second development apparatus $132_2$, and others.

Figures 7A, 7B:
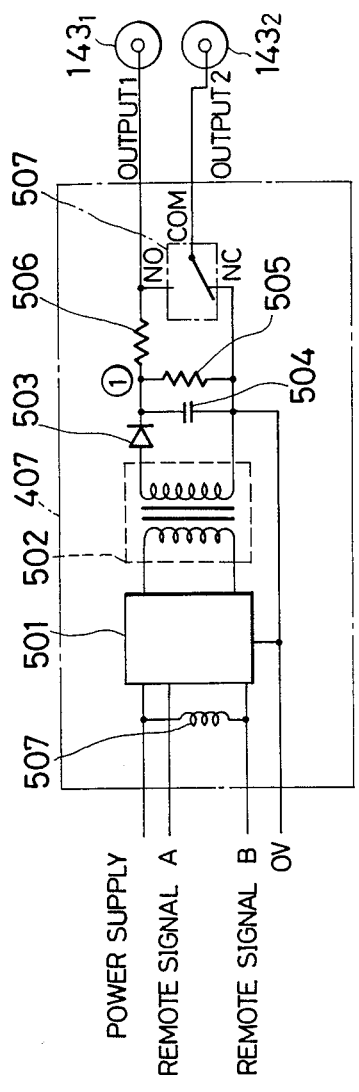
FIGS. 7(a) and 7(b) are a block diagram and a relational diagram, respectively, of the development bias power supply.

Further, connected to the microcomputer 400 via an output interface circuit 406 are the display board 353 of the control panel 2, polarity switching solenoids 209 for the first development apparatus $132_1$ and the second development apparatus $132_2$, reversible motor, development bias power supply 407 for the first development apparatus $132_1$ and the second development apparatus $132_2$, charging power supply for the charger 108, transfer power supply 408 for the transfer charger 111, detachment power supply 409 for the detachment charger 112, discharge lamp 114, main motor, shutter solenoid, motor for reciprocating motion of the turning mirror 34, light source control circuit for controlling the ON/OFF operation of the light source for photographing the film, and for controlling the applied voltage, heater lamp 413 which constitutes a heating means so as to keep the surface temperature of the heat rollers 119 at a constant temperature, heater control circuit 414 for controlling the turning on and off of the heater lamp, various kinds of solenoid 415, and so forth. The input remote signals for the development bias power supply 407 have, for instance, 2-bit construction as shown in FIG. 7(b). From combinations of these signals the impressed voltages to the magnetic roller $143_1$ of the first development apparatus $132_1$ and the magnetic roller $143_2$ of the second development apparatus $132_2$ are arranged to be switched as shown in the truth table of FIG. 7(b).

In the case of carrying out the P→P development, a voltage, for example, of 0V is applied to the magnetic roller $143_2$ of the second development apparatus $132_2$, and in the case of carrying out the N→P development, a voltage, for example, of 400 V is applied to the magnetic roller $143_1$ of the first development apparatus $132_1$. By controlling the voltage to be applied in this manner, it can be prevented to have a development due to the development apparatus which is not used, even when the removal of the developer from the development roller of the development apparatus which is not in use is not complete. Moreover, unwitting development by the other development apparatus can be prevented so that it is possible to avoid color mixing and realize an improvement of the image quality.

FIGS. 7(a) and 7(b) are a circuit diagram and a truth table which show an embodiment of the development bias power supply 407.

In the figures, the development bias power supply 407 consists of a main control portion 501, boosting transformer 502, diode 503, capacitor 504, resostirs 505 and 506, and relay 507. The main control circuit 501 switches the boosting transformer 502 in response to the remote signals A and B. The output of the boosting transformer 502 is rectified and smoothed by the diode 503 and the capacitor 504, and is applied to the magnetic roller as a direct current. The resistor 505 is provided for discharging the charge accumulated in the capacitor 504, and the resistor 506 is provided for controlling the added current. On the output side of the resistor 506, there are connected the output 1 which is connected to the magnetic roller $143_1$ of the first development apparatus $132_1$ and the normally open terminal of the relay 507. The normally closed terminal of the relay 507 is connected to 0V, and its common terminal is connected to output 2 that is connected to the magnetic roller $143_2$ of the second development apparatus. Further, the exciter of the relay 507 is connected between the power supply and the remote signal B.

Now, the main control circuit 501 switches the boosting transformer 502 so as to have the voltage at the point 1 in the figure to be as shown in the truth table shown in FIG. 7(b), in response to the remote signals A and B. Then, the voltage is switched by the relay 507 to have the values as shown in the truth table.

Figure 8A:
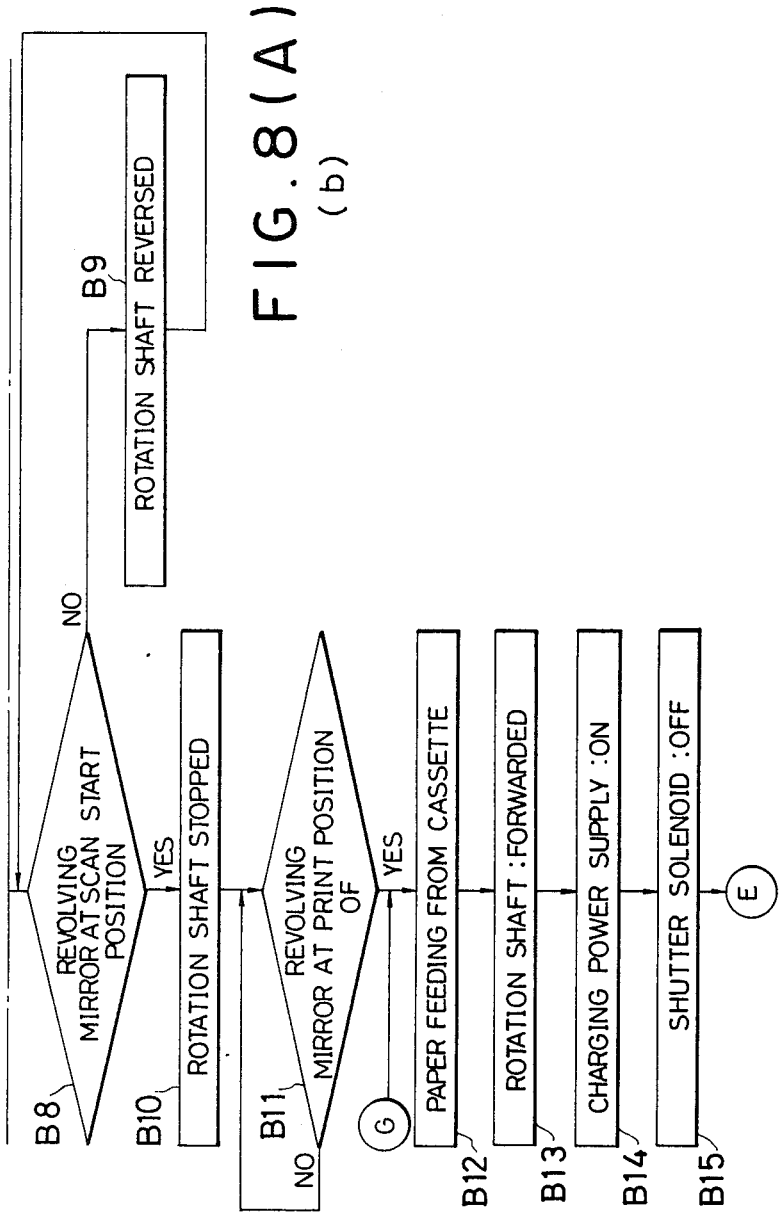
Figure 8B:
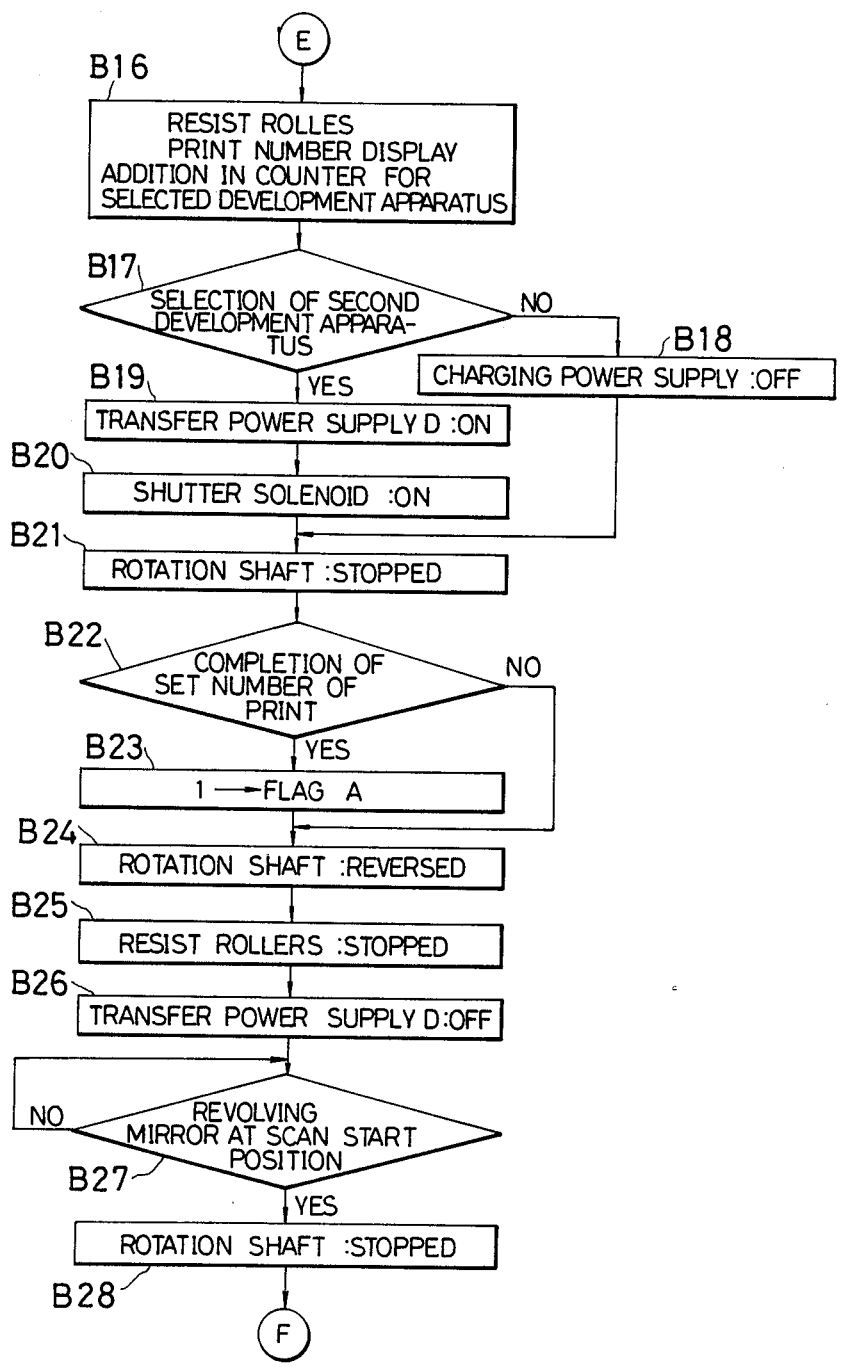

Next, referring to the flow charts shown in FIGS. 8(a), 8(b), and 8(c), the printing operation in particular will be described.

First, when the power supply is connected and the main motor, discharge lamp, heater lamp, development bias power supply, charging power supply, and the various kinds of initial set states are completed, the apparatus finds itself in the standby condition.

Then, with the pressing of the print key 357, it proceeds to step B1. In step B1, although the detail will be omitted, within an interruption processing, 1 is set for flag B to move the turning mirror 34 to the printing position and to light up the light source 11 in a selected printint mode, and then proceed to step B2.

In step B2, the blade solenoid 129 of the cleaner 113 is turned on, and the pole position switching solenoid of the selected development apparatus is turned on, to proceed to step B3.

In step B3, the reversible motor is rotated in the direction of the selected development apparatus, and the main motor and the discharge lamp 114 are turned on, to proceed to step B4.

In step B4, whether the selected apparatus is the second development apparatus $132_2$ is checked, and it proceeds to step B5 if the second development apparatus is not selected. In step B5, the remote signal E of the detachment power supply 410, and the remote signal B of the development bias power supply 407 are turned on before proceeding to step B7.

On the other hand, if the second development apparatus was selected, it proceeds to step B6. In step B6, the remote signals E, F, and G of the charging power supply 406 and the detachment power supply 409 are turned on, and the remote signal B of the development bias power supply 407 is turned off, to proceed to step B7. Here, the timing for driving the charging power supply is set to be started, for example, after elapse of a prescribed length of time that may be fixed to each different program, from the start of drive of the photosensitive drum. In other words, in the inverted development (positive→negative), the toner is charged positively so that if the charger is not turned on, the portions that are not desired to be developed will also be developed during the rotation of the photosensitive drum 107. On the other hand, if charging alone is carried out and the development bias is not turned on, the toner will be attached to the surface of the development roller due to the relation between the potentials of the photosensitive drum and the development roller. Therefore, an additional consumption of the toner can be prevented by turning on the development apparatus after a predetermined length of time as in the above.

In step B7, the remote signal A of the development bias power supply 407 is turned off, with the timing that the point where charging on the photosensitive drum 107 was started arrives at the development position of the second development apparatus $132_2$, to proceed to step B8.

In step B8, whether the turning mirror 34 is positioned at the scan start position is checked, and if it is at the scan start position, it proceeds to step B10. On the other hand, if it is not at the scan start position, the rotation shaft of the turning mirror 34 is reversed in the direction to bring back the turning mirror 34 to the scan start position, and returns to step B8. In step B10, the rotation shaft is brought to a stop to proceed to step B11.

In step B11, whether the turning mirror 34 is at the printing position is checked, and if the answer is affirmative, it proceeds to step B12. In step B12, paper feeding oprtation from the paper feeding cassette 4 is started, and then proceeds to step B13.

In step B13, the rotational shaft is rotated forward to start the film operation, and proceeds to step B14.

In step B14, the charging power supply 406 is turned on, and proceeds to step B15. In step B15, the shutter solenoid for shielding the light path is turned off, and proceeds to step B16.

In step B16, the paper is forwarded to the image transfer portion 116 by rotating the resist roller 118, decrease by one the displayed content of the copy number display portion on the control panel, and increase by one the counter for the selected development apparatus which is not shown, and it proceeds to step B17.

In step B17, whether the second development apparatus is selected is checked, and if the answer is negative, it proceeds to step B18. In step B18, the charging power supply 406 is turned off, and proceeds to step B21.

On the other hand, if the answer in step B17 is affirmative, it proceeds to step B19.

In step B19, the remote signal D of the transfer power source 408 is turned on, with the timing in which from the resist rollers 118 are rotated in step B16, the leading edge of the paper arrives at the image transfer portion 116, that is, time $T_c$ after the resist rollers 118 are started to rotate, and it proceeds to step B20.

In step B20, the shutter solenoid is turned on to shiedl the scanning light on the photosensitive drum 107, and it proceeds to step B21. In step B21, the rotation shaft is brought to a stop to complete the film operation, and proceeds to step B22.

In step B22, whether set number of printing is completed is checked, and if the answer is negative, it proceeds to step B24, and if the answer is affirmative, it proceeds to step B23.

In step B23, 1 is set to flag A in order to carry out again the film projection operation, and it proceeds to step B24. In step B24, the rotation shaft is rotated in the reverse direction to start the operation of returning the turning mirror 34 to the scan start position, and it proceeds to step B25.

In step B25, the resist rollers 118 are brought to a stop, and it proceeds to step B26. In step B26, the remote signal D of the transfer power supply 408 is turned off with a timing in which the trailing edge of the peper P passes by the image transfer portion 116, in other words, after elapse of time $T_B$ from the point in time corresponding to the falling edge of the detection signal of the paper P, and it proceeds to step B27.

In step B27, whether the turning mirror 34 is at operation start position is checked, and if the answer is affirmative, it proceeds to step B28. In step B28, the rotation shaft is brought to a stop, and proceeds to step B29.

In step B29, whether printing of set number is completed is checked, and if the answer is negative, it returns to step B12 to repeat the operation described earlier.

On the other hand, if the answer in step B29 is affirmative, it proceeds to step B30. In step B30, whether the concentration of the developer for the selected development apparatus is above the minimum level is checked by the signal from the developer concentration detector of the selected development apparatus, and if the answer is affirmative, it proceeds to step B32, and if the answer is negative, it proceeds to step B31.

In step B31, whether the developer was supplied continuously for a predetermined length of time, and if the answer is negative, it returns to step B30 to repeat the above operation. When the developer is supplied continuously for a predetermined length of time, it proceeds to step B32. In step B32, the pole switching solenoid 209 is turned off, and it proceeds to step B33.

In step B33, the charging power supply 406 is turned off, and it proceeds to step B34. In step B34, if the second development apparatus is selected, it proceeds to step B35.

In step B35, the development bias power supply 407 is turned off with the timing in which the point at which the charging of the photosensitive drum 107 is completed in step B33 arrives at the development position of the second development apparatus $132_2$, and it proceeds to step B36.

On the other hand, if the second development apparatus was not selected in step B34, it proceeds to step B36 by skipping the step B35. In step B36, the development bias power supply 407, transfer power supply 408, and detachment power supply 409 are turned off, and it proceeds to step B37.

In step B37, the main motor, reversible motor, and discharge lamp 114 are all turned off, and it proceeds to ste B38. In step B38, the blade solenoid 129 of the cleaner 113 is turned off, and it returns to the standby condition.

Next, the overall operation of the microfilm reader-printer with the above construction will be described briefly.

In projecting a film, first, the grip portion 13 shown in FIG. 1 is pulled out toward the front, and set a microfilm between the transparent plates by opening the upper transparent plate of the film pressing plates 3.

Next, the main switch 358 on the control panel 2 is pressed down to light up the light source 11 for projection. Then, it becomes possible to visualize an enlarged image of the microfilm. Here, focus adjustment is done by the rotational operation of the vanes on the focus adjusting member that is provided in advance. The positioning of the projected image is accomplished by moving the grip portion 13 in back and forth and left and right direction while watching the projection screen 1 or the coordinates on the third front panel 323 that are designated by the pointer 14. Further, by the rotational operation of a projected image adjusting gear that may be provided in advance dpending upon the need, it becomes possible to facilitate the rotation of the projected image on the projection screen 1.

(Printing Operation of the Film Image)

Next, the operation of printing the enlarged image of the microfilm on a paper P in the paper feeding cassette 4 will be described. In this case, if copy waiting display appears on the display board 353 of the control panel 2, the light source 11 is turned off by turning on the standby key 356, and waits until the heater in the image formation unit 100 warms up. In the meantime, by pressing an operating button which is not shown, the turning mirror 34 shown in FIG. 1 is moved in the direction from the rear surface to the front surface of FIG. 1, and set the turning mirror 34 over the lens holder portion 21.

When the heater is warmed up and copy enable display appears on the display board 353, the standby key is turned off. Then, either one of the P—P selection key 351 and the N—P selection key 352 is selected to match the kind of the microfilm image. After that, number of prints is selected by the copy number setting key 354, and let the printing operation start by pressing the copy start key 357. Then, the projected light scans by the turning mirror 34 synchronized with the rotational drive of the photosensitive drum 107, and irradiates the photosensitive drum 107 via the scanning light guiding unit 50.

On the other hand, the photosensitive drum 107 is charged by the charger 108 as prescribed, in response to the P→P development or the N→P development, and an electrostatic latent image is formed based on the scanning light. After that, when the photosensitive durm 107 comes to the position which faces the development device 110, there is formed a positive developer image, by the first development apparatus 132, for a letent image based on a positively recorded microfilm, and by the second development apparatus $132_2$ for a latent image based on a negatively recorded microfilm.

Following that, the developer image is transferred to the paper P by the transfer charger 111 in response to the P→P development or the N→P development, and further the paper P is detached from the photosensitive drum 107 by the detachment charger 112. The paper P is led by passing the paper transporting route 117 to the heat rollers 119 where the transferred image is fixed by melting, and then is ejected by the paper eject rollers 120 to the tray for ejected paper 104 which is on the front side of the apparatus. On the other hand, the residual toner on the photosensitive drum 107 is cleaned by the cleaner 113, and further the residual image on the photosensitive drum 107 is erased by the discharge lamp 114 to be prepared for the next copying operation, if there occurs a jamming of the paper P while it is on the paper transporting route 117, the operator can detect it by the paper jamming display on the control board 353. Then, the operator opens the first side panel 326 and by rotating the upper frame 102 with the supporting axis 103A as the center, he can easily remove the paper P from the paper transporting route 117.

Figure 9:
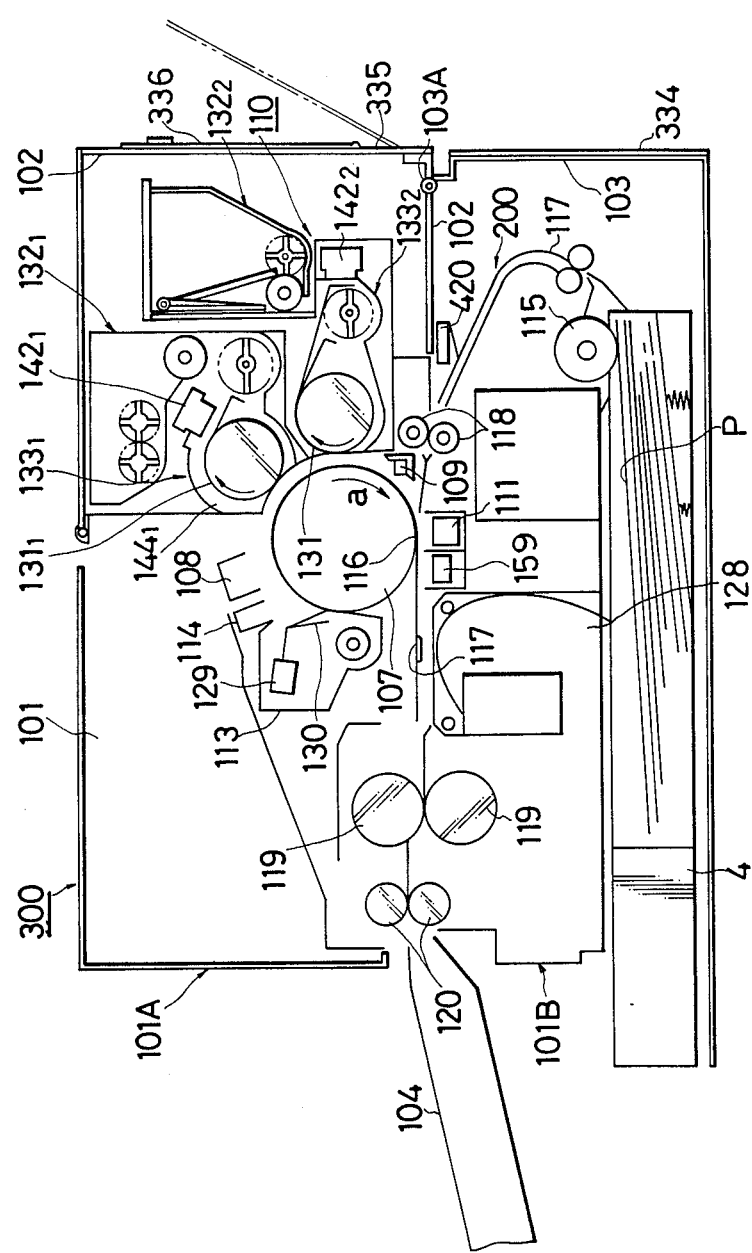
FIG. 9 is a schematic cross sectional view of the image forming unit in a second embodiment of the microfilm reader-printer in accordance with the present invention.

Referring to FIG. 9, there is shown the image formation unit of a second embodiment of the microfilm reader-printer in accordance with the present invention. In the second embodiment, the power supply for a detachment means which detaches a recording medium that is charged corresponding to a plurality of development modes, is constructed as a detachment power supply by an AC power supply portion with variable AC component and a DC power supply portion which can superpose a predetermined DC output component on the AC output component of the AC power supply portion, where detachment conditions corresponding to the plurality of development modes can be set by varying at least the AC output components of the detachment power supply.

Figure 10:
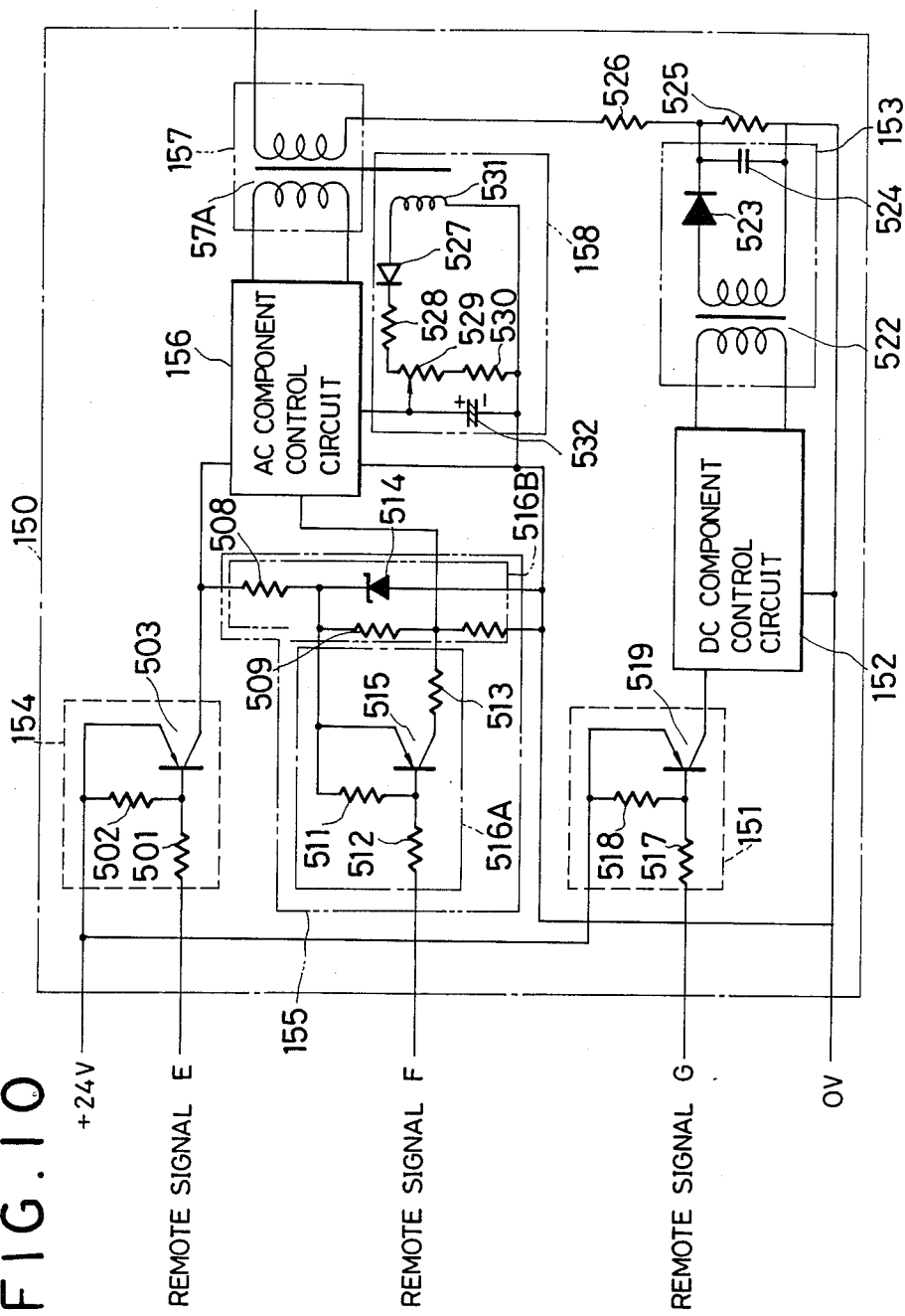
FIG. 10 is a circuit diagram which illustrates the configuration of the detachment power supply for the detachment means in the image forming unit shown in FIG. 9.
Figures 11, 12:
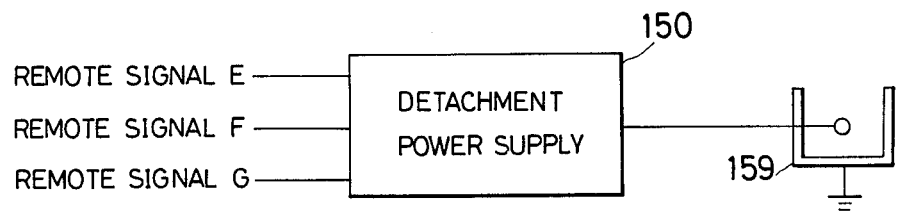
FIG. 11 is a block diagram for showing an embodiment of the detachment means of the apparatus.
FIG. 12 is an explanatory diagram for showing the relationship between the on-off states of the remote signal for the detachment power supply and the voltage applied to the detachment charger.

The image formation apparatus 300 includes a detachment power supply 150 shown in FIG. 10 and a detachment charger 159 which takes in the output of the detachment power supply 150 as shown in FIG. 11 and displays a detachment function to be described later. Other construction is similar to the first embodiment so that further explanation will be omitted.

The detachment power supply 150 takes in remote signals E, F, and G that is sent from the control circuit, which is not shown, of the present apparatus corresponding to a plurality of development modes, and varies the output voltage in various ways.

Namely, the detachment power supply 150 is controlled by an AC component ON circuit 154 which is controlled by the remote signal E, and the remote signal F, and is constructed by a reference voltage setting circuit 155 which sends out a predetermined reference voltage, and AC component control circuit 156 which sends out an AC voltage based on the output, of the reference voltage setting circuit 155, that is taken in, a DC component ON circuit 151 which is controlled by the remote signal G, a DC component control circuit 152 which sends out AC voltage as the DC component based on the output of the DC component ON circuit 151, a DC output circuit 153 which boosts the AC voltage from the DC component control circuit 152, and rectifies the AC voltage to a direct current and sends out as a DC output voltage, a detachment voltage supply circuit 157 which boosts the AC voltage from the the AC component control circuit 156 and superposes on it the DC output voltage from the DC output circuit 153, and sends out the resultant to the detachment charger 151, and a feedback circuit 158 connected between the detachment voltage supply circuit 157 and the AC component control circuit 156, and feeds back a portion of the AC output.

The AC component ON circuit 154 consists of resistors 501 and 502 and a transistor 503. When the remote signal E is turned on (low level), the transistor 503 is turned on and supplies the power supply voltage (+24 V) to the reference voltage setting circuit 155 and the AC component control circuit 156.

The reference voltage setting circuit 155 includes a reference voltage switching circuit 516A which is formed by resistors 511, 512, and 513 and a transistor 515, resistors 508, 509, and 510 which vary the value of the reference voltage by the turning on and off of the reference voltage switching circuit 516A, and a voltage division stabilizing circuit 516B which consists of a Zener diode 514.

The DC component ON circuit 151 consists of transistors 517 and 518 and a transistor 519, and when the remote signal G is turned on, the transistor 519 is turned on, and supplies the power source voltage to the DC component control circuit 152.

The DC output circuit 153 consists of a boosting transformer 522, a rectifying diode 523, a smoothing capacitor 524, and resistors 525 and 526. It boosts the AC voltage from the DC component control circuit 152, and sends out a DC output voltage obtained by rectifying and smoothing the boosted voltage to the detachment voltage supply circuit 157.

The detachment voltage supply circuit 157 contains a boosting trnaformer 57A, the primary winding that is wound around the core is connected to the AC component control circuit 156 and the secondary winding is connected to the detachment charger 159, and the DC output voltage is takes in from one terminal of the secondary winding.

The feedback circuit 158 is constructed by a tertiary winding 531 which is wound around the core, a diode 527, a resistor 528, a variable resistor 529, a resistor 530, and an electric field capacitor 532. The voltage that is induced in the tertiary winding 531 is rectified by the diode 527, and is voltage divided by the resistors 528 and 530 and the variable resistor 529 to be fed back to the AC component control circuit 156.

Next, referring to FIG. 9, the configuration of the image forming apparatus 300 that includes the detachment means of the above construction will be described.

In FIG. 9, 101 is the body of the image forming apparatus, and on the bottom side of the body is fitted the paper feeding cassette 4 and on the left side surfe (front side of the microfilm reader-printer) there is fitted the tray for ejected paper 104. Further, at about the center of the body, there is arranged a photosensitive drum 107 which is the image carrier. Over the photosensitive drum 107 there are arranged a shutter mechanism which is not shown for shielding the scanning light from the scanning light guiding unit and a solenoid for driving the shutter mechanism.

In the surroundings of the photosensitive drum 107, there are arranged successively the charger 108 which is the charging means, the development device 110, the pretransfer discharger 109, the transfer charger 111 which is the transfer means, the detachment charger 159 of the detachment means, the cleaner 113, the discharge lamp 114, and so on. In addition, in the lower part of the body 101, there is provided the transporting system 200 which contains the paper transporting route 117 that leads a paper P that is taken out automatically from the paper feeding cassette 4 via a paper feeding roller 115, through the image forming portion (image transfer portion) 116 between the photosensitive drum 107 and the transfer charger 111, to the tray for ejected paper 104. On the upstream side of the image transfer portion 116 of the paper transporting route 117, there are provided the detector 420 for detecting the paper P and the resist rollers 118. On its downstream side, there are arranged the heat rollers 119 as the fixing means, and on still further downstream there are arranged paper eject rollers 120.

Moreover, to the body 101, there are hinged the upper frame 102 that has the first side panel 336 and the lower frame 103 that has the second side panel 334, that are hinged via the supporting axis 103A. In the upper frame 102, in the circumference of the photosensitive drum 107, there are attached the charger 108, development device 110, cleaner 113, discharge lamp 114, and others with appropriate means, to form the upper unit 101A.

In addition, to the lower frame 103, mechanisms such as the paper feeding cassette 4, paper feeding roller 115, transfer charger 111, detachment charger 112, heat rollers 119, paper eject rollers 120, and tray for ejected paper 104, and the main motor are attached by appropriate means, to form the lower unit 101B.

After opening the first side panel 336 by rotating it, by rotating the upper frame 102 with the supporting axis 103A as the center, it is possible to open and close the body 101 approximately along the paper transporting route of paper P (also called the claim shell structure).

Because of this, it is convenient for the removal of jammed paper and for maintenance. Further, 129 is a blade solenoid for accessing to and receding the cleaning blade 130 of the cleaner 113, from the photosensitive drum 107.

Next, the development device 110 will be described in detail. As shown in FIG. 9, the development device 110 has a first development roller $131_1$, and a second development roller $131_2$. By selectively driving the devlopment rollers $131_1$ and $131_2$, it is possible to develop an image on the microfilm which is recorded positively into a positive image (called the first development mode) and to develop an image on the microfilm which is recorded negatively into a positive image (called the second development mode).

Namely, the development device 110 is subdivided into a first development apparatus $132_1$ that contains the first development roller $131_1$ and a second development apparatus $132_2$ that contains the second development roller $131_2$. The first development apparatus $132_1$ carries out the positive→positive development, and the second development apparatus $132_2$ carries out the negative→positive development.

In addition, on the control panel 2, there are provided exposure regulating volume, P—P development selection key, N—P development selection key, display board, copy number setting key, clear-stop key, the standby key, copy start key, main switch, ant the others.

Next, the operation of the image forming apparatus with the above construction will be described centering around the detachment means.

As the detachment means, for the case of the first development mode of the positive→positive development, there are set a first AC mode which supplies an AC voltage corresponding to the first development mode, and a first superposition mode which superposes a DC voltage to the AC voltage. For the case of the second development mode of the negative→positive development, there are set as the detachment means, a second AC mode which can supply an AC voltage that is different from the AC voltage of the first AC mode, and a second superposition mode which superposes a DC voltage to the AC voltage.

First, the photosensitive drum 107 is charged uniformly by the charger 108 when it is driven in the direction of the arrow a of the figure, projected light from the scanning light guiding unit is imaged successively on the photosensitive drum 107, and an electrostatic latent image is formed. The electrostatic latent image thus formed is brought out explicitly be being developed by the development device 110, and is sent to the side of the transfer charger.

On the other hand, a paper P supplied by the paper feeding cassette 4, after the passing condition of its leading and trailing edges are detected by the detector 420, is supplied by the resist rollers 118 to the image transfer portion 116, where an image which was formed in advance on the photosensitive drum 107 is transferred to the paper P by the transfer charger 111.

The paper P which has an image transferred in this manner is detached from the photosensitive drum 107 by the detaching function of the detachment charger 159, led to the heat rollers 119 by passing the paper transporting route 117, and after the transferred image is fixed by melting there, is ejected by the paper eject rollers 120 to the tray for ejected paper 104.

On the other hand, after transferring the image to the paper P, the residual image on the photosensitive drum 107 is erased, and the drum 107 is prepared for the next copying operation.

Next, referring to FIG. 13, the cases of carrying out the positive→positive (abbreviated as P→P hereinafter) development and the negative→positive development, in the development device 110 of the above configuration will be described in detail.

Figure 13:
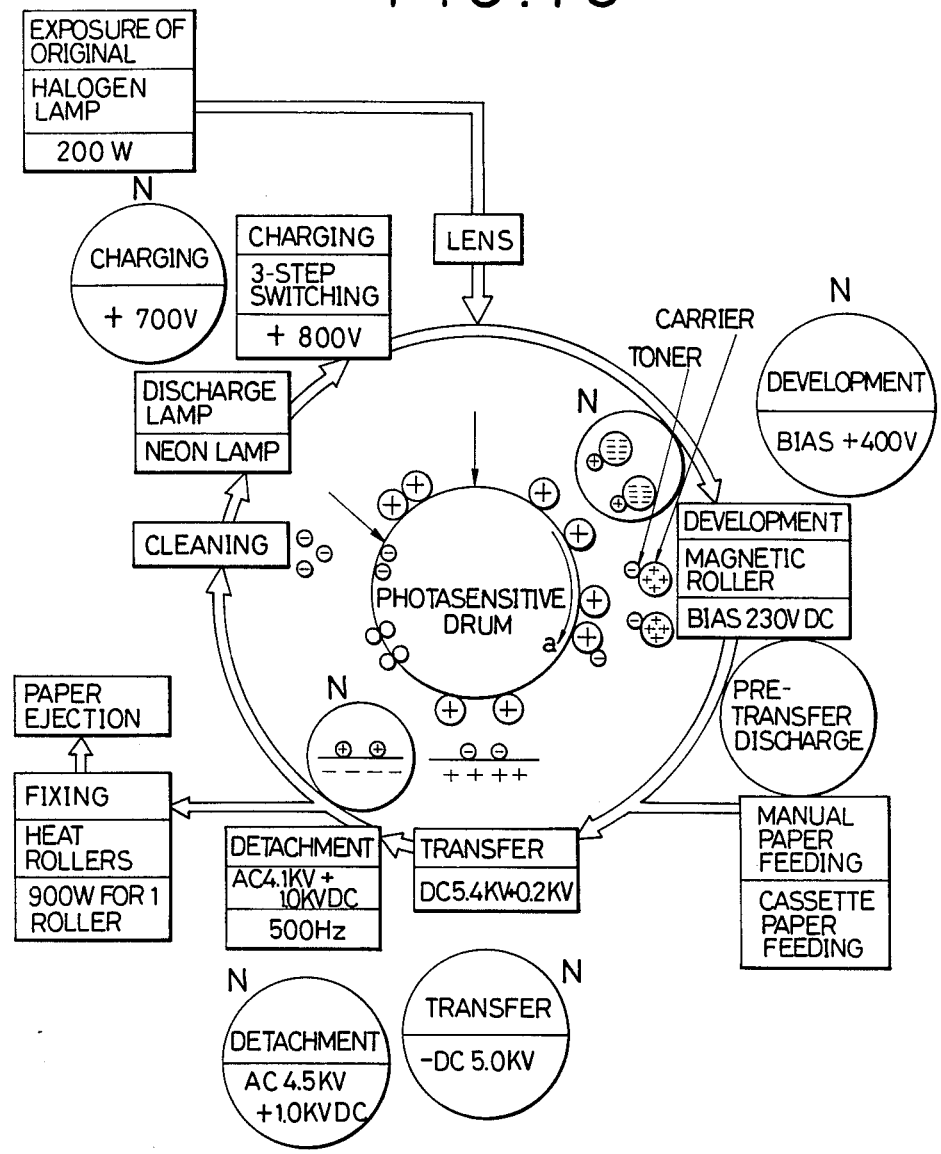
FIG. 13 is an explanatory diagram for showing the operations of the P→P development and the N→P development.

FIG. 13 is an explanatory diagram for illustrating the operations of the P→P development and the N→P development. In FIG. 13, the operations shown within rectangles refer to the P→P development operation (the first development mode), and only the operations in the N→P development (the second development mode) which differ from those of the P→P development are shown in the circles.

First, the P→P development will be described. To carry out the P→P development, the P—P selection key on the control panel 2 is pressed down, and the first development apparatus $132_1$ alone is set to the operating condition in accordance with the operations of the development device 110. In the P→P development, the charger 108 is to charge the surface of the photosensitive drum 107 positively with a surface potential of 800 V. After this, the projected light on the microfilm is set by the scanning of the turning mirror 34 to irradiate the photosensitive drum 107 via the scanning light guiding unit.

Assuming that a letter "A" on a positively recorded microfilm, for example, is to be developed, the projected light (scanning light) for the letter A will be irradiated on the photosensitive drum 107, corresponding to the portions other than that of the letter A.

Accordingly, the surface potential on the photosensitive drum 107 that correspond to the portions other than that of the letter A is attenuated, and the surface potential on the photosensitive drum 107 that corresponds to the region of the letter A alone survives. As a result, there is formed an electrostatic latent image that corresponds to the letter A on the photosensitive drum 107.

On the other hand, the magnetic roller that is contained inside of the first development apparatus $132_1$ is applied with a bias voltage of 300 V, and the toner and the carrier within the developer mechanism portion $133_1$ are frictionally charged negatively and positively, respectively, according to the charging series for the two materials. The toner which is transported together with the carrier along the peripheral surface of the sleeve $144_1$ is adsorbed on the surface of the photosensitive drum 107 by the Coulomb force due to facing with the latent image on the surface of the photosensitive drum 107, to bring out explicitly the electrostatic latent image.

On the other hand, a paper P supplied by the paper feeding cassette 4 is synchronized by the resist rollers 118 which are controlled by the control circuit, and is led to the transfer charger 111. The developed image is brought to the transfer charger 111 according to the rotation of the photosensitive drum 107, and its image is transferred to the paper P by the transfer charger 111 at the position of the image transfer portion 116.

Here, the applied voltage to the transfer charger 111 is set at DC 5.4 kV.

After that, the paper P is detached from the photosensitive drum 107 by the detachment charger 112.

In that case, the detachment charger 151 is driven at an AC voltage of 4.1 kV. In other words, in this case, among the remote signals supplied from the control circuit to the detachment power supply 150, the remote signal E is turned on (low) and the remote signals F and G are turned on (high), that is, the first AC mode is selected.

In this case, the transistor 503 of the AC component ON circuit 154 is turned on, and by that, after the power supply voltage is stabilized by the resistor 508 of the voltage division stabilization circuit 516B and the Zener diode 514, voltage divided by the resistors 509 and 510, and are input to the AC component control circuit 156 as reference voltages. By this operation, a predetermined AC voltage is sent out from the AC component control circuit 156. This AC voltage is boosted to AC 4.1 kV which is determined by setting beforehand the feedback coefficient of the feedback circuit 158 in the detachment voltage supply circuit 157. And, this high voltage is supplied to the detachment charger 112 as the AC output voltage (detachment voltage). In this case, the DC component ON circuit will not be actuated since the remote signal G is turned off so that the AC voltage will not be superimposed by a DC component.

On the other hand, when the quality of the paper P is different from that of the to be used for the first AC mode and the charging condition differs from what is described in the above, there is selected the first superposition mode. In this case, the remote signals that are sent from the control circuit to the detachment power supply 150 are controlled so as to have the remote signal E and G to be turned on and the remote signal F to be turned off.

In this case, similar to the case in the above, there appears an AC output voltage which is boosted to AC 4.1 kV appears on the output side of the detachment voltage supply circuit 157, and also the power supply voltage is supplied via the DC component control circuit 152 to the DC output circuit 153 due to turning on of the DC component ON circuit 151. Here, after undergoing boosting and smoothing it is brought to a DC output voltage of +1.0 kV which is set beforehand, and is supplied to the secondary winding of the boosting transformer of the detachment voltage supply circuit.

As a result, it becomes possible to apply to the detachment charger 159 a voltage which is a superposition of a high voltage AC voltage and a DC voltage (AC 4.1 kV+DC 1.0 kV) as the detachment voltage. Since in this way it becomes possible to change the detachment condition so that detachment errors based on the quality of the paper P or the like can be avoided.

The paper P that is detached from the photosensitive drum in this manner is led to the heat rollers 119 by passing the paper transporting route 117, and after the transferred image is fixed by melting there, is ejected to the tray for ejected paper 104. In this way, the P→P development is completed.

Next, the N→P development will be described. In carrying out the N→P development, the N→P selection key on the control panel 2 is pressed down, and only the second development apparatus 132$_2$ is set to the operating condition according to the operation of the development device described in the foregoing.

In the N→P development, the charger 108 charges the surface of the photosensitive drum 107 positively to a surface potential of 800 V.

Following that, the projected light for the microfilm irradiates the surface of the photosensitive drum 107 via the scanning light gurding unit.

In this case, differing from the case in the above, the projected light (scanning light) for the microfilm irradiates the photosensitive drum 107 corresponding to the part of the letter A alone. Consequently, the surface potential for the region on the photosensitive drum 107 that corresponds to the letter A is attenuated, and the surface potential of the portion on the photosensitive drum 107 that corresponds to the region other than that of the letter A survives.

Now, the magnetic roller contained in the second development apparatus 132$_2$ is impressed with a bias voltage of 400 V, and the toner and the carrier are frictionally charged positively and negatively, respectively, according to the charging series for both materials. Accordingly, the region that correspond to the portion of the letter A (region where the surface potential is attenuated) of the photosensitive drum 107 has an apparently negative potential with respect to the magnetic roller, and the toner which is charged positively with respect to this region is adsorbed by Coulomb force.

As a result, on the surface of the photosensitive drum 107 there is formed a lutent image corresponding to the letter A. After that, the latent image arrives at the pre-transfer discharge lamp 109 accompanying the rotation of the photosensitive drum 107, and a pre-transfer discharge is carried out there. This is because the paper usually tends to be charged negatively, and in N→P development, the surface potential of the area other than the developed region on the photosensitive drum 107 remains high so that detachment of the paper P from the photosensitive drum 107 fails sometimes to be done satisfactorily unless a pre-transfer discharge is not given. In other words, the pre-transfer discharge is done to enhance the detachment effect.

Next, the image on the photosensitive drum 107 is transferred to the paper P at the position of the image transfer portion by the transfer charger 111 which is controlled as described earlier. In this case, the transfer charger 111 is applied a voltage of DC −5.0 kV in order to transfer the toner which is charged positively. Then, the paper P is detached from the photosensitive drum 107 by the detachment charger 112.

As the detachment conditions for the detachment means in the second development mode either the second AC mode or the second superposition mode is selected.

Of these two modes the second AC mode will be described first.

In this case, the remote signals E and F are turned on and the remote signal G is turned off. By this arrangement, both of the transistor 503 of the AC component ON circuit 154 and the transistor 515 of the reference voltage switching circuit 516A are turned on, and a reference voltage which is different from that of the first AC mode is supplied from the reference voltage switching circuit 516A to the AC component control circuit 156. Namely, the remote signal F is turned on in this case so that the power supply voltage is stabilized by the resistor 508 and the Zener diode 514, and further, the stabilized voltage is divided by the resistors 509 and 513 that are connected parallel and a resistor 510 and the voltage thus obtained is sent to the AC component control circuit 56 as a reference voltage.

As a result, based on the reference voltage, the AC component control circuit 156 sends an AC voltage which differs from that in the case of the P→P development described above.

With the above, a high voltage at AC 4.5 kV is sent from the detachment voltage supply circuit 157 to the detachment charger 159, and detachment of the paper P is carried out. In this manner, the reference voltage can be varied by turning on or off of the remote signals, and the AC component among the detachment conditions can be changed.

It should be noted that in the second AC mode, analogous to the case of the first AC mode, there is not included a DC component in the high voltage for detachment.

Next, the second superposition made will be described.

In this case, all of the remote signals, E, F, and G are turned on.

With this arrangement, the DC component On circuit 151 is also turned on, and DC 1.0 kV of the DC output circuit 153 is superposed on the output of the detachment voltage supply circuit 157. Thus, a detachment output voltage AC 4.5 kV +DC 1.0 kV is applied to the detachment charger 159, and detachment of the paper P is carried out under the detachment conditions that are different from those of the second AC mode.

Further, the ejection operation of the paper P after completion of detachment is identical to the cases described earlier.

As in the above, in both of the first and the second development modes, it is easy to control whether or not to superpose a DC component on the detachment output voltage by the turning on and off of the remote signal G, so that it becomes possible to provide a detachment means which can set various kinds of detachment conditions.

It should be noted that as in the second AC mode, when the remote signals are turned off, impedance on the secondary winding side of the boosting transformer of the detachment voltage supply circuit 157 varies slightly every time when the polarity of the output voltage is changed due to the presence of the diode 527. Namely, when the output side (the detachment charger 159 side) of the secondary winding is positive, the impedance is the resultant of the impedance of the detachment charger 159 and the resistor 526, and when the output side of the secondary winding is negative, the impedance is the resultant of the impedance of the detachment charger 159, the resistor 525, and the capacitor 524.

However, the difference of these impedances is small compared with the overall difference in the impedances so that it can be neglected.

Further, in addition to the above method, the AC component of the detachment voltage can be accomplished by varying the feedback coefficient (amount of feedback to the output) through adjustment of the variable resistor 529 of the feedback circuit 158.

More precisely, these methods can be applied to the cases when the set value of the detachment output voltage is to be changed in response to the gap between the detachment charger 159 and the photosensitive drum 107, difference in size of individual apparatus body, difference in the environmental conditions, and so forth.

It should be mentioned that the present invention is not limited to these embodiments and various modifications and alterations are possible within the scope of the invention. Thus, for instance, although in the foregoing embodiments description was given in conjunction with the cases of setting detachment conditions for the detachment means in the case of four development modes, the invention is not limited to this case alone and can be applied to realize easily the setting of large number of detachment conditions by varying the circuit elements of the detachment charge in various ways.

According to the second embodiment described in detail in the foregoing, there can be obtained a detachment means for which detachment conditions that correspond to a plurality of development modes can be set in an easy manner. Because of this, it is possible to provide an image forming apparatus which can not only display an excellent detachment function in response to each development mode and accordingly enhance the reliability of the apparatus, but also can avoid an increase in the cost and the conditions on produc development.

Various modifications will become possible for those skilled in the art after receiving the teachings of the present disclosure without departing from the scope thereof.

What is claimed is:

1. An image forming apparatus for forming electrostatic latent images on an image bearing member by irradiating images and developing the electrostatic latent images to form the images, said apparatus comprising:
    a first development means for developing the latent image formed on said image bearing member in a predetermined first mode;
    a second development means for developing the latent image formed on said image bearing member in a predetermined second mode;
    control means for selectively producing first and second output voltages to said first development means and said second development means when any one of said first and second development means is used; and
    a development bias power supply means including a voltage stepping-up transformer, a main control portion and a relay connected to the primary winding of the transformer, a diode and a first resistor connected in series between one terminal of the secondary winding of the transformer and the first magnetic roller of said first development means, a capacitor and a second resistor connected in parallel between the cathode of said diode and the other terminal of the secondary winding of the transformer, and relay contacts (No, Nc) provided at each one terminal of said first and second resistors, one terminal of a movable arm switch (Com) of said relay being connected to the second magnet-roller of said second development means.

2. The image forming apparatus as claimed in claim 1 wherein said first development means is a positive-positive development means ($132_1$) and said second development means is a negative-positive development means ($132_2$).

3. The image forming apparatus as claimed in claim 1 wherein said control means comprises:
    a microprocessor having a CPU, a ROM, and a RAM, for performing various operations and calculations and for producing various control signals including remote signals in accordance with a control program and detected signals from switches and sensors, and
    said development bias power supply means being responsive to the remote signals from said microprocessor for selectively producing first and second output voltages to a first magnet-roller of said first development means and a second magnet-roller of said second development means when any one of said first and second development means is used.

4. The image forming apparatus as claimed in claim 3 wherein when said negative-positive development means is used, a predetermined low voltage is applied to the first magnet-roller of said positive-positive development means, which is lower than the voltage applied to the latter means when the latter means is in use, while when said positive-positive development means is used, a predetermined high voltage is applied to the second magnet-roller of said negative-positive development means, which is higher than the voltage applied to the latter means when the latter means is in use.

5. The image forming apparatus as claimed in claim 1 wherein said movable arm switch is changed-over from a normally opened contact side to a normally closed contact side in accordance with a predetermined combination of ON-OFF condition of the remote signals applied to the main control portion.

6. The image forming apparatus as claimed in claim 5 wherein the ON-OFF control mode is carried out in accordance with the following table between the remote signals and the first and second output voltages from the development bias power supply means;

| FIRST REMOTE SIG | SECOND REMOTE SIG | FIRST OUTPUT VOLTAGE | SECOND OUTPUT VOLTAGE |
| --- | --- | --- | --- |
| OFF ("0") | OFF ("0") | 0 V | 0 V |
| OFF ("0") | ON ("1") | 0 V | 0 V |
| ON ("1") | OFF ("0") | 230 V | 0 V |
| ON ("1") | ON ("1") | 400 V | 400 V |

7. The image forming apparatus as claimed in claim 1 wherein said image bearing member is a photo-sensitive drum and said first predetermined mode is a positive-positive development mode, while said second predetermined mode is a negative-positive development mode.

* * * * *